(Model.)

P. J. SCHLICHT.
INDEX.

No. 347,304.                                Patented Aug. 10, 1886.

| DIVISIONS OF SURNAMES, OR First Part of Corporate Names. | SUB-DIVISIONS BY FIRST LETTER OF GIVEN NAME, or First Letter of Second Capitalized part of Firm or Corporate Name containing no Given Name. |||||||||||||
|---|---|---|---|---|---|---|---|---|---|---|---|---|
| | A B | C D | E | F | G | H I | J | K L | M | N O P Q | R S T U | V W X Y Z |
| | Page. Sec. | Page. Sec. | Page. Sec. | Page. Sec. | Page. Sec. | Page. Sec. | Page. Sec. | Page. Sec. | Page. Sec. | Page. Sec. | Page. Sec. | Page. Sec. |
| A | | | | | | | | | | | | |
| Aa. Ab Ac............ | 1 1 | 1 1 | 1 6 | 1 6 | 1 6 | 1 6 | 2 1 | 2 1 | 2 1 | 2 6 | 2 6 | 2 6 |
| Ad Ae Af Ag........ | 3 1 | 3 1 | 3 6 | 3 6 | 3 6 | 3 6 | 4 1 | 4 1 | 4 1 | 4 6 | 4 6 | 4 6 |
| Ah Ai Aj Ak......... | 3 1 | 3 1 | 3 6 | 3 6 | 3 6 | 3 6 | 4 1 | 4 1 | 4 1 | 4 6 | 4 6 | 4 6 |
| Al Am............... | 5 1 | 5 6 | 6 1 | 6 1 | 6 6 | 6 6 | 7 1 | 7 8 | 7 8 | 8 1 | 8 1 | 8 8 |
| An Ao Ap Aq........ | 9 1 | 9 6 | 10 1 | 10 1 | 10 6 | 10 6 | 11 | 12 1 | 12 1 | 12 7 | 13 1 | 13 6 |
| Ar................... | 14 1 | 14 1 | 14 6 | 14 6 | 14 6 | 14 6 | 15 1 | 15 1 | 15 1 | 15 6 | 15 6 | 15 6 |
| As At Au Av......... | 16 1 | 16 1 | 16 8 | 16 8 | 17 1 | 17 1 | 17 4 | 18 1 | 18 1 | 18 1 | 18 6 | 18 6 |
| Aw Ax Ay Az........ | 16 1 | 16 1 | 16 8 | 16 8 | 17 1 | 17 1 | 17 4 | 18 1 | 18 1 | 18 1 | 18 6 | 18 6 |
| B | | | | | | | | | | | | |
| Baa Bab Bac Bad Bae | 19 1 | 19 1 | 19 6 | 19 6 | 19 6 | 19 6 | 20 1 | 20 1 | 20 1 | 20 6 | 20 6 | 20 6 |
| Baf Bag Bah Bai Baj. | 19 1 | 19 1 | 19 6 | 19 6 | 19 6 | 19 6 | 20 1 | 20 1 | 20 1 | 20 6 | 20 6 | 20 6 |
| Bak Bal Bam........ | 21 1 | 21 1 | 21 6 | 21 6 | 21 6 | 21 6 | 22 1 | 22 1 | 22 1 | 22 6 | 22 6 | 22 6 |
| Ban Bao Bap Baq... | 21 1 | 21 1 | 21 6 | 21 6 | 21 6 | 21 6 | 22 1 | 22 1 | 22 1 | 22 6 | 22 6 | 22 6 |
| Bar Bas Bat Bau Bav | 23 1 | 23 6 | 24 1 | 24 1 | 24 6 | 24 6 | 25 1 | 25 8 | 25 8 | 26 1 | 26 1 | 26 6 |
| Baw Bax Bay Baz... | 23 1 | 23 6 | 24 1 | 24 1 | 24 6 | 24 6 | 25 1 | 25 8 | 25 8 | 26 1 | 26 1 | 26 6 |
| Bea Beb Bec Bed Bee | 27 1 | 27 1 | 27 8 | 27 8 | 28 1 | 28 1 | 28 4 | 29 1 | 29 1 | 29 1 | 29 6 | 29 6 |
| Bef Beg Beh Bei Bej. | 27 1 | 27 1 | 27 8 | 27 8 | 28 1 | 28 1 | 28 4 | 29 1 | 29 1 | 29 1 | 29 6 | 29 6 |
| Bek Bel Bem........ | 30 1 | 30 1 | 30 8 | 30 8 | 31 1 | 31 1 | 31 4 | 32 1 | 32 1 | 32 1 | 32 6 | 32 6 |
| Ben Beo Bep Beq... | 30 1 | 30 1 | 30 8 | 30 8 | 31 1 | 31 1 | 31 4 | 32 1 | 32 1 | 32 1 | 32 6 | 32 6 |
| Ber Bes Bet Beu Bev | 33 1 | 33 6 | 34 1 | 34 1 | 34 6 | 34 6 | 35 1 | 35 8 | 35 8 | 36 1 | 36 1 | 36 6 |
| Bew Bex Bey Pez... | 33 1 | 33 6 | 34 1 | 34 1 | 34 6 | 34 6 | 35 1 | 35 8 | 35 8 | 36 1 | 36 1 | 36 6 |
| Bf Bh Bi Bj.......... | 37 1 | 37 1 | 37 8 | 37 8 | 38 1 | 38 1 | 38 4 | 39 1 | 39 1 | 39 1 | 39 6 | 39 6 |

WITNESSES=
H. G. Phillips.
S. A. Lattimore.

Fig. 1.

INVENTOR=
Paul J. Schlicht,
by Geo. B. Selden,
Atty.

(Model.)

P. J. SCHLICHT.
INDEX.

No. 347,304.  Patented Aug. 10, 1886.

[SAMPLE TABLE.]

SCHLICHT'S STANDARD INDEX—TABULAR FORM.
For 125,000 and 250,000 Names.

SUB-DIVISIONS BY FIRST LETTER OF GIVEN NAME,
or First Letter of Second Capitalized part of Firm or Corporate Name containing no Given Name.

| DIVISIONS OF SURNAMES, OR First Part of Corporate Names. | A B | C D | E | F | G | H I | J | K L | M | N O P Q R | S T U | V W X Y Z |
|---|---|---|---|---|---|---|---|---|---|---|---|---|
| | Page. | Page. | Page. | Page. | Page. | Page. | Page. | Page. | Page. | Page. | Page. | Page. |
| A | | | | | | | | | | | | |
| Aa Ab Ac | 1 | 2 | 3 | 3 | 4 | 4 | 5 | 7 | 7 | 8 | 9 | 10 |
| Ad | 11 | 12 | 13 | 13 | 14 | 14 | 15 | 17 | 17 | 18 | 19 | 20 |
| Ae Af Ag Ah Ai Aj Ak | 21 | 22 | 23 | 23 | 24 | 24 | 25 | 27. | 27 | 28 | 29 | 30 |
| Al | 31 | 33 | 35 | 36 | 37 | 38 | 39 | 43 | 43 | 45 | 47 | 49 |
| Am | 51 | 51 | 52 | 52 | 52 | 52 | 53 | 54 | 54 | 54 | 55 | 55 |
| An Ao | 56 | 58 | 60 | 61 | 62 | 63 | 64 | 68 | 68 | 70 | 72 | 74 |
| Ap Aq | 76 | 76 | 76 | 76 | 76 | 76 | 77 | 77 | 77 | 78 | 78 | 78 |
| Ar | 79 | 81 | 83 | 84 | 85 | 86 | 87 | 91 | 91 | 93 | 95 | 97 |
| As | 99 | 100 | 101 | 101 | 102 | 102 | 103 | 105 | 105 | 106 | 107 | 108 |
| At Au Av Aw Ax Ay Az | 109 | 110 | 111 | 111 | 112 | 112 | 113 | 115 | 115 | 116 | 117 | 118 |
| B | | | | | | | | | | | | |
| Baa Bab Bac | 119 | 119 | 120 | 120 | 120 | 120 | 121 | 122 | 122 | 123 | 123 | 123 |
| Bad Bae Baf Bag Bah | 124 | 124 | 124 | 124 | 124 | 124 | 125 | 125 | 125 | 126 | 126 | 126 |
| Bai Baj | 127 | 128 | 129 | 129 | 130 | 130 | 131 | 133 | 133 | 134 | 135 | 136 |
| Bak | 137 | 138 | 139 | 139 | 140 | 140 | 141 | 143 | 143 | 144 | 145 | 146 |
| Bal | 147 | 148 | 149 | 149 | 150 | 150 | 151 | 153 | 153 | 154 | 155 | 156 |
| Bam Ban Bao Bap Baq | 157 | 158 | 159 | 159 | 160 | 160 | 161 | 163 | 163 | 164 | 165 | 166 |

Fig. 2.

WITNESSES—
H. G. Phillips.
S. A. Lattimore

INVENTOR—
Paul J. Schlicht,
by Geo. B. Selden,
Atty.

(Model.)

P. J. SCHLICHT.
INDEX.

No. 347,304. Patented Aug. 10, 1886.

| DIVISIONS OR OF SURNAMES, First Part of Corporate Names. | SUB-DIVISIONS BY FIRST LETTER OF GIVEN NAME, or First Letter of Second Capitalized part of Firm or Corporate Name containing no Given Name. |||||||||||||
|---|---|---|---|---|---|---|---|---|---|---|---|---|---|
| | A | B | C D | E | F | G | H I | J | K L | M | N O P Q | R S T U | V W X Y Z |
| | Page. | Page. | Page. | Page. | Page. | Page. | Page. | Page. | Page. | Page. | Page. | Page. Sec. | Page. |
| Aa | 1 | 3 | 1 | 1 | 1 | 1 | 1 | 2 | 2 | 2 | 2 | 2 | 2 |
| Aba | | 3 | 3 | 3 | 3 | 3 | 3 | 4 | 4 | 4 | 4 | 4 | 4 |
| Abb | 5 | | 6 | 7 | 7 | 8 | 8 | 9 | 11 | 11 | 12 | 13 | 14 |
| Abc Abd Abe Abf Abg | 15 | | 16 | 17 | 17 | 18 | 18 | 19 | 21 | 21 | 22 | 23 | 24 |
| Abh Abi Abj Abk Abl | 25 | | 25 | 25 | 25 | 25 | 25 | 26 | 26 | 26 | 26 | 26 | 26 |
| Abm Abn Abo Abp Abq | 25 | | 25 | 25 | 25 | 25 | 25 | 26 | 26 | 26 | 26 | 26 | 26 |
| Abr | 27 | | 28 | 29 | 29 | 30 | 30 | 31 | 33 | 33 | 34 | 35 | 36 |
| Abs Abt Abu Abv | 37 | | 37 | 37 | 37 | 37 | 37 | 37 | 37 | 37 | 37 | 37 | 37 |
| Abw Abx Aby Abz | 37 | | 37 | 37 | 37 | 37 | 37 | 37 | 37 | 37 | 37 | 37 | 37 |
| Aca Acb Acc Acd Ace | 38 | | 38 | 39 | 39 | 39 | 39 | 40 | 40 | 40 | 41 | 41 | 41 |
| Acf Acg Ach Aci Acj | 38 | | 38 | 39 | 39 | 39 | 39 | 40 | 40 | 40 | 41 | 41 | 41 |
| Ack | 42 | | 43 | 44 | 44 | 45 | 45 | 46 | 48 | 48 | 49 | 50 | 51 |
| Acl Acm Acn Aco Acp | 52 | | 52 | 52 | 52 | 52 | 52 | 53 | 53 | 53 | 53 | 53 | 53 |
| Acq Acr Acs Act Acu | 52 | | 52 | 52 | 52 | 52 | 52 | 53 | 53 | 53 | 53 | 53 | 53 |
| Acv Acw Acx Acy Acz | 52 | | 52 | 52 | 52 | 52 | 52 | 53 | 53 | 53 | 53 | 53 | 53 |
| Ada Adb Adc | 54 | | 59 | 64 | 64 | 69 | 69 | 74 | 84 | 84 | 89 | 94 | 99 |
| Add | 104 | | 104 | 104 | 104 | 104 | 105 | 105 | 105 | 106 | 106 | 106 | 106 |
| Ade Adf Adg Adh | 107 | | 107 | 108 | 108 | 108 | 108 | 109 | 109 | 109 | 110 | 110 | 110 |
| Adi Adj Adk | 107 | | 107 | 108 | 108 | 108 | 108 | 109 | 109 | 109 | 110 | 110 | 110 |
| Adl | 111 | | 111 | 112 | 112 | 112 | 112 | 113 | 114 | 114 | 114 | 115 | 115 |
| Adm Adn Ado Adp Adq | 116 | | 116 | 116 | 116 | 116 | 117 | 117 | 117 | 118 | 118 | 118 | 118 |
| Adr Ads Adt Adu Adv | 116 | | 116 | 116 | 116 | 116 | 117 | 117 | 117 | 118 | 118 | 118 | 118 |

WITNESSES=
H. G. Phillips.
S. A. Lattimore

Fig. 3.

INVENTOR=
Paul J. Schlicht,
by Geo. B. Selden,
atty.

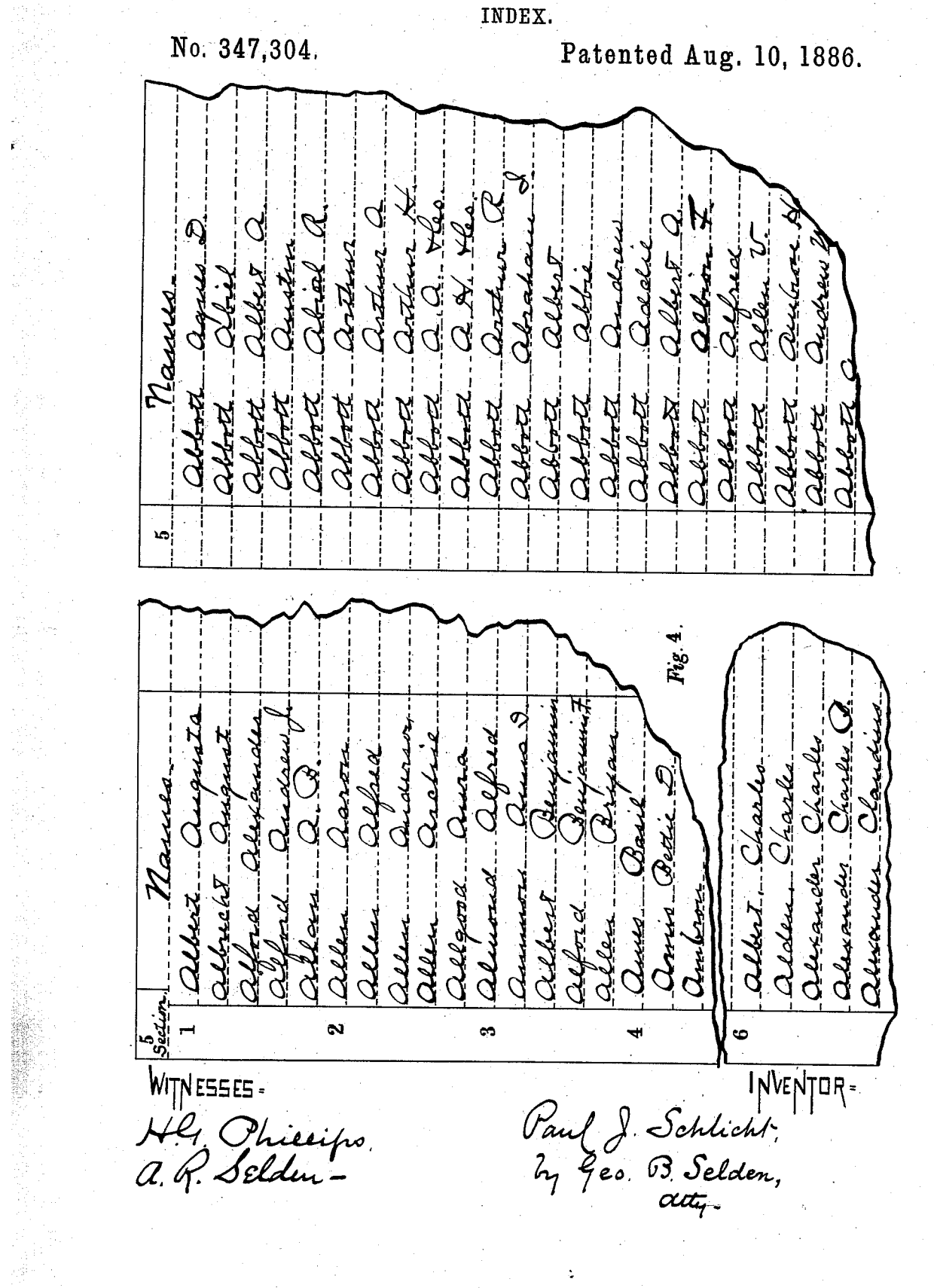

(Model.)

P. J. SCHLICHT.
INDEX.

No. 347,304. Patented Aug. 10, 1886.

Fig. 4.

WITNESSES:
H. G. Phillips.
A. R. Selden.

INVENTOR:
Paul J. Schlicht,
by Geo. B. Selden,
Atty.

UNITED STATES PATENT OFFICE.

PAUL J. SCHLICHT, OF ROCHESTER, NEW YORK.

INDEX.

SPECIFICATION forming part of Letters Patent No. 347,304, dated August 10, 1886.

Application filed August 6, 1883. Serial No. 102,869. (Model.)

*To all whom it may concern:*

Be it known that I, PAUL J. SCHLICHT, of Rochester, New York, have invented certain Improvements in Indexes, of which the following is a specification, reference being had to the accompanying drawings.

My invention relates to certain improvements in indexes, which improvements are fully described in the accompanying specification and drawings, and the novel features thereof specified in the claims.

My improved index system is illustrated in the accompanying drawings, in which Figure 1 represents a portion of my improved index-table as arranged for twenty-five thousand and fifty thousand names. Fig. 2 represents the same for one hundred and twenty-five thousand and two hundred and fifty thousand names. Fig. 3 represents the same for one million names. Fig. 4 represents the pages of the name-book.

In carrying my invention into practical use I will first describe my improved index-table and the mode of operating the same adopted by me for twenty-five thousand names, or any less number. I construct a table, a portion of which is shown in Fig. 1, and which table consists of two series of intersecting or crossing columns, one of which is headed with the letters of the alphabet, (either singly or in subdivisions of two or more letters,) this series of columns in the example shown being placed vertically, and the other, which is arranged horizontally in this example, being headed with the letters of the alphabet arranged in their alphabetical order in twos or threes, so that reference can easily be made to them. Thus under the letter A for the above-mentioned number of names or less, I have found it convenient to provide eight columns, which are headed, respectively, first, Aa, Ab, Ac; second, Ad, Ae, Af, Ag; third, Ah, Ai, Aj, Ak; fourth, Al, Am; fifth, An, Ao, Ap, Aq; sixth, Ar; seventh, As, At, Au, Av; eighth, Aw, Ax, Ay, Az. At the points where the two series of columns cross each other are given a series of numbers which indicate the pages in the name-book.

In the illustration given in Fig. 1 the vertical columns headed with the letters of the alphabet in their proper order refer to given names, while the horizontal columns refer to surnames. Thus, suppose it be required to find the page in the name-book on which the name Frank Atwater occurs, the searcher refers to the vertical column headed F, the first letter of the given name opposite At, the first two letters of the surname in question, and finds the number 16 at the point where these two columns intersect, which is the page of the name-book on which the above name is entered. Further reference may be made to the particular section on the said page on which the required name is to be found by the section-number 8, which indicates the section or subdivision of the page containing the names.

For the names of corporations and firms I use the first and second essential parts, as illustrated in the following examples: Thus Bank of Commerce is found where the horizontal column Ban crosses the vertical column C, page 21, section 1; Bancroft & Co. under Ban—C, page 21, section 1; Sibley, Lindsay & Co. under Si—L, page 508, section 1; Albany & Susquehanna Railroad Co. under Al—S, page 8, section 1; Alpena Mining Company, page 7, section 8.

In Fig. 1 I have given the subdivisions of the first letters of the surnames down to Bj for the above-mentioned total number of names. For the balance of the table the constructor can use as many or few subdivisions as his judgment may dictate, the following example, which I have used in practice, serving as a guide. Thus, besides the thirteen horizontal columns given under B in Fig. 1, I employ fifteen more, which are headed, respectively, Bl; Boa, Bob, Boc, Bod, Boe; Bof, Bog, Boh, Boi, Boj; Bok, Bol, Bom, Bon, Boo; Bop, Boq, Bor; Bos, Bot, Bou, Bov; Bow, Box, Boy, Boz; Bra, Brc, Bre, Bri; Bro, Bru, Bry, Brz, Bs; Bua, Bub, Buc, Bud, Bue; Buf, Bug, Buh, Bui, Buj; Buk, Bul, Bum, Bun, Buo; Bup, Buq; Bur, Bus, But, Buv, Buw; Bux, Buy, Buz, By, Bz.

In further illustration, I subdivide the letter C into nineteen columns headed as follows: Caa, Cab, Cac, Cad, Cae; Caf, Cag, Cah, Cai, Caj; Cak, Cal, Cam, Can; Cao, Cap, Caq; Car, Cas, Cat, Cau, Cav; Caw, Cax, Cay, Caz; Cc, Ce, Cha; Che, Chi, Chl, Chm; Cho, Chr, Chu, Chy; Ci, Cl, Cn; Coa, Cob, Coc, Cod; Coe, Cof, Cog, Coh; Coi, Coj, Cok; Col, Com, Con;

Coo, Cop, Coq, Cor; Cos, Cot, Cou, Cov; Cow, Cox, Coy, Coz; Cr, Cs; Cu, Cw, Cy, Cz.

My improved index-table is arranged with suitable subdivisions, more or less numerous, under each letter of the alphabet, as above indicated, and it may be written or printed on one or more sheets of paper, and used separate from or bound in with the name book or books to which reference is to be made. The index-table may also be made with the vertical columns arranged to indicate the surnames, if preferred.

In Fig. 2, which represents a portion of my improved index-table as arranged by me for one hundred and twenty-five thousand and two hundred and fifty thousand names, the subdivisions of the first letters of the surnames are made more numerous, and the section-numbers on the pages of the name-book may be omitted.

The manner of indexing is so simple that no directions, beyond a few examples, are necessary. To find pages on which to index Edward Adams, look in the column E, (first letter of given name,) opposite Ad, (first letters of surname,) page 13. To find page for Charles Banning, Charles Banning & Co., or Daniel Bancroft, look in column C D, Ban, page 158. In a firm or corporate name having no given name the second capitalized part determines subdivision, same as given name. Thus it will be readily seen that on the same page with Charles Banning should be indexed such names as the following: Banning & Co., Banning & Campbell, Bancroft, Cole & Co., Bank of Commerce.

In Fig. 3 I have given the first part of my improved index-table as arranged by me for one million names, and as used by the United States War Department. It will be observed that the surname subdivisions are in this case very much increased in number.

In preparing tables for use in particular localities it may be desirable to make provision for the frequent occurrence of foreign names. Thus in Minnesota, where there is a large Swedish population, surname-divisions commencing with Bj, Ol, and other letters, would be used which are unusual in English. In adapting my improved table to names in foreign languages also corresponding changes would require to be made.

It is obvious that the vertical columns may, if preferred, be used for the surnames and the horizontal columns for the given names.

The name-book may be a book giving references to another book or series of books, or it may contain entries showing the history of the transaction with which the party whose name appears therein was or is connected. Thus, suppose the name-book to be a record of mortgages. It may contain an abstract of the instrument in question, the names of the mortgagor and mortgagee, a description of the property mortgaged, and such other information as may be desired.

In a modified form of my improved index-table I use the first vowels, or the first consonant after the first vowels, or other distinguishing character of the given names to head the vertical columns shown in the accompanying illustrations.

I am aware that an index has been provided with columns headed by single initial letters of the surnames, and intersecting columns headed with single initial letters of the given names, with numbers to indicate the pages at the point where the columns intersect, and to such arrangement I lay no claim. As compared with this system, my plan is highly advantageous when used for large numbers of names, by reason of the fact that my system affords a greatly-increased number of subdivisions, and thus reduces the space to be examined in searching for any particular name.

It will be perceived that under the old system, above referred to, any two names having the same initials must fall in the same subdivision. Under my system, on the contrary, names having like initials are further subdivided and classified, according to subsequent letters appearing therein.

I am aware that indexes have been made with intersecting columns headed by single initial letters, so that reference could be readily made to names bearing like initials, all of which were combined in a single group. My index differs therefrom in having a still further subdivision, whereby names having like initials are subdivided into secondary groups, according to the secondary letters or initials, thus enabling the searcher to select instantly the particular name required, instead of being compelled to search through all names having like initials.

I claim—

1. An index-table having a series of columns headed by the first two or more letters of surnames in divisions in the alphabetical order of succession, a series of intersecting columns headed by the first letters of given names alphabetically arranged, and page-indicating numbers at the points of intersection, in combination with a name-book paged to correspond with the index-table, substantially as described and shown, whereby the names bearing like initials are subdivided into smaller groups, to the end that the searcher may instantly select the particular name required.

2. An index-table having columns headed by the first two or more letters of surnames in divisions in alphabetical order of succession, a series of intersecting columns headed by indicating-letters of given names alphabetically arranged, and page-indicating numbers at the points of intersection, in combination with a name-book paged to correspond with the index-table, and divided into sections in the manner described and shown, whereby the names bearing like initials are subdivided into smaller groups, to the end that the searcher may instantly select the particular name required.

3. An index-table for compound names—that is to say, those composed of Christian name and surname—having a column containing the first two or more letters of one name, another column containing the first letter of the other name, and page-indicating numbers in line with both columns, substantially as described, whereby names of the same initials are subdivided into different groups or classes, according to the letters following said initials.

PAUL J. SCHLICHT.

Witnesses:
A. R. SELDEN,
H. G. PHILLIPS.